United States Patent
Fishman et al.

[11] Patent Number: 6,041,915
[45] Date of Patent: Mar. 28, 2000

[54] VIBRATORY CONVEYOR WITH SIDE-MOUNTED DRIVERS

[75] Inventors: Oleg S. Fishman, Maple Glen, Pa.; Ted Haines, Mount Holly, N.J.

[73] Assignee: Inductotherm Corp., Rancocas, N.J.

[21] Appl. No.: 09/025,010

[22] Filed: Feb. 17, 1998

[51] Int. Cl.[7] .......................... B65G 22/16; B65G 27/24; B65G 27/22
[52] U.S. Cl. .......................... 198/766; 198/769; 198/770
[58] Field of Search ............................ 198/770, 769, 198/768, 767, 766

[56] References Cited

U.S. PATENT DOCUMENTS

| | | | |
|---|---|---|---|
| Re. 29,512 | 1/1978 | Musschoot | 198/770 |
| 2,913,912 | 11/1959 | Radermacher | 74/61 |
| 2,948,419 | 8/1960 | Seibert, Jr. | 214/6 X |
| 3,014,587 | 12/1961 | Philippovich | 209/326 X |
| 3,061,079 | 10/1962 | Morris | 198/220 |
| 3,212,629 | 10/1965 | Maeder et al. | 198/220 X |
| 3,226,989 | 1/1966 | Robins | 74/87 |
| 3,346,097 | 10/1967 | Carrier, Jr. | 198/220 |
| 3,348,664 | 10/1967 | Renner | 198/220 |
| 3,604,555 | 9/1971 | Cowper | 198/220 DB X |
| 4,632,751 | 12/1986 | Johnson et al. | 209/326 |
| 5,265,730 | 11/1993 | Norris et al. | 209/326 X |
| 5,762,176 | 6/1998 | Patterson et al. | 198/770 |

FOREIGN PATENT DOCUMENTS

| | | |
|---|---|---|
| 1 148 331 | 12/1957 | France . |
| 2741054 | 5/1997 | France . |
| 18 68 501 | 11/1962 | Germany . |
| 1272608 | 7/1968 | Germany . |
| 2301075 | 11/1996 | United Kingdom . |

*Primary Examiner*—Christopher P. Ellis
*Assistant Examiner*—Kenneth W Bower
*Attorney, Agent, or Firm*—Seidel, Gonda, Lavorgna & Monaco, PC

[57] ABSTRACT

A vibratory conveyor assembly including a material transporting trough driven by oscillating motion which imparts a force causing materials located in the trough to be advanced. The conveyor includes a continuous, unitary saddle plate attached about the trough perpendicular to a longitudinal axis of the trough. Actuators are coupled to the saddle plate which imparts the oscillating force to the trough.

7 Claims, 4 Drawing Sheets

VIBRATORY CONVEYOR WITH SIDE-MOUNTED DRIVERS

FIELD OF THE INVENTION

The invention pertains to a vibratory conveying apparatus for use in material handling, and more particularly, to a vibratory conveyor assembly which utilizes oscillating motion to convey material along a path.

BACKGROUND OF THE INVENTION

Vibrating conveyors have been used in the United States for over a century. Only within the past few decades, however, has there been extensive use of such conveyors. The successful application of various types of vibrating conveyors in different industries has resulted in an ever increasing demand for such conveyors.

Vibrating conveyors generally include a material-transporting trough driven by a controlled vibratory force which imparts a tossing, hopping, or sliding-type action to the material to be transported from one point to another. The vibratory force generator may be electromagnetic, electromechanical, pneumatic, or hydraulic.

One major factor that differentiates a vibratory conveyor from conventional materials handling equipment is that the material is "live" and moves independently of the conveying medium. In contrast, on a conventional belt conveyor, the material is static and only the conveying medium moves.

A variety of vibrating conveyors have been designed. Each design generally has similar basic elements: a trough in which the material is conveyed; a base which mounts the conveyor in place and ties all of the elements together; a trough supporting system to direct the motion of the trough; and a drive assembly such as an eccentric drive assembly which serves as a source of controlled vibrating motion applied to the trough. Many designs also include a reactor spring system which alternately stores and releases energy at each end of the trough stroke.

The trough is the only component that comes in contact with the material being conveyed. It may be fabricated from a variety of materials in almost any shape and size. The base is primarily a way of mounting the conveyor and usually incorporates structural steel members. It may be designed as an elaborate trusslike structure or may have a simpler design. The primary function of the trough supporting system is to control and direct the motion of the trough.

The drive assembly is the source of the controlled vibration. It may be in the form of a positive direct-connected linkage, a positive flexible-connected linkage, or a non-positive motorized counterweight assembly.

The reactor spring system may include steel coil springs, flexible steel or glass slats, rubber blocks, circular rubber toroids, or torsion bars. The particular application involved may make one type more advantageous than another.

A conventional vibratory conveyor is shown in FIGS. 1 and 2. Two major components of such a vibratory conveyor include the trough 2, and a drive assembly. In FIG. 2, the drive assembly includes actuators 4, 4'. The actuators 4, 4' are coupled to the side of trough 2 via a connecting rod 5. The rods 5 are typically welded to the side of the trough 2 and the actuator 4. The conveyor body is isolated from the floor or other supporting surface by damping isolators 6, such as springs or rubber shock absorbers. The actuators 4, 4' vibrate the trough 2 back and forth in the direction of the arrow 8, so that the vibration causes loose pieces of charge in the conveyor trough 2 to be thrown, and levitates them for a short time above the bottom of the trough 2. The actuators 4, 4' are connected to trough 2 at an acute angle a with the horizontal plane of the trough bottom. Within each vibration cycle, the pieces inside the conveyor receive an impulse up (a function of sin α) and forward (a function of cos α) and levitate. The trough is then moved down (a function of -sin α) and back (a function of -cos α). Therefore, when the levitated pieces fall back onto the trough 2 bottom, they actually move forward in the direction of arrow 10. This causes continuous movement of the loose charge in the trough from back to front, along the longitudinal axis of the trough 2 until the charge reaches the discharge end 14 of the conveyor.

A typical actuator 4 comprises ac motors and two eccentric weights 12a, 12b, mounted on opposite ends of the motor shaft. The conveyor includes two actuators 4 and 4', one on each lateral side of the trough 2. Each actuator is mounted at an acute angle a to the vertical. The motors provide rotation to the eccentric weights 12a, 12b, 12a' and 12b' of equal rotational speed ω. Weights 12a and 12b are mounted on their respective motor shaft to rotate in a direction opposite and 180° out-of-phase relative to 12a' and 12b'. Forces produced by the rotating weights 12a, 12b, 12a' and 12b' substantially cancel each other along the transverse axis of the conveyor and add along the conveyor longitudinal axis. The force along the longitudinal axis is responsible for trough vibration and resulting movement of loose charge pieces.

When rotating weight actuators are used to provide the vibration force, an equal number of actuators are used on each side of the trough to eliminate transverse motion of the conveyor. Because these transverse forces are equal in magnitude and act in opposite directions, there is no net displacement of the conveyor trough in the transverse direction. However, in conventional conveyors these transverse forces generate severe destructive stresses in the individual members comprising the conveyor structure. To prevent damage from these forces to the conveyor members, the conveyor is constructed using heavy construction steel, adding to the size, weight, and price of the conveyor.

Even when a heavy steel construction is used, the connection point between the actuators 4, 4' and the trough 2 is continuously stressed due to the forces generated by the individual actuators. Eventually the weld connection between the trough 2 and the actuator 4 or 4' will fracture, potentially causing catastrophic results. Therefore, it is desired to have a vibratory conveyor assembly which better manages and withstands the destructive transverse forces, and which can be built less expensively, is more efficient, and more reliable.

SUMMARY OF THE INVENTION

The present invention is a vibratory conveyor assembly comprising a material-transporting trough, a frame supporting the trough, first and second gussets connected to opposite sides of the trough, a saddle plate extending between the gussets, a pair of actuators connected to the saddle plate, one of the actuators proximate to each of the gussets, wherein actuators are mounted to impart an oscillating motion to the saddle plate which is transferred to the trough through the gussets, to cause the trough to move reciprocally.

BRIEF DESCRIPTION OF THE DRAWINGS

For a better understanding of the present invention, reference is made to the accompanying drawings. The drawings show one embodiment of the invention as presently preferred. However, it should be understood that the invention is not limited to the precise arrangements and instrumentalities shown in the drawings.

DETAILED DESCRIPTION OF THE INVENTION

Figure 1:
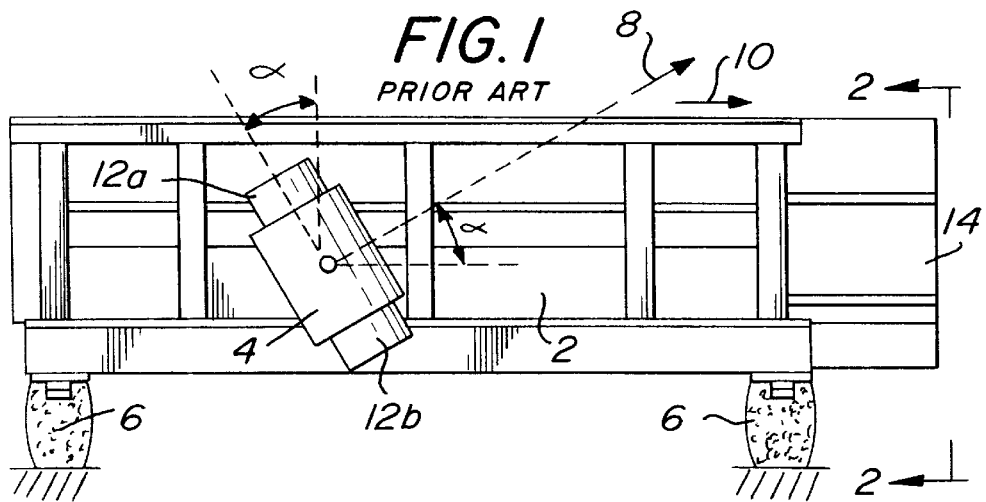
FIG. 1 is a side view illustrating a conventional vibratory conveyor according to the prior art.
Figure 2:
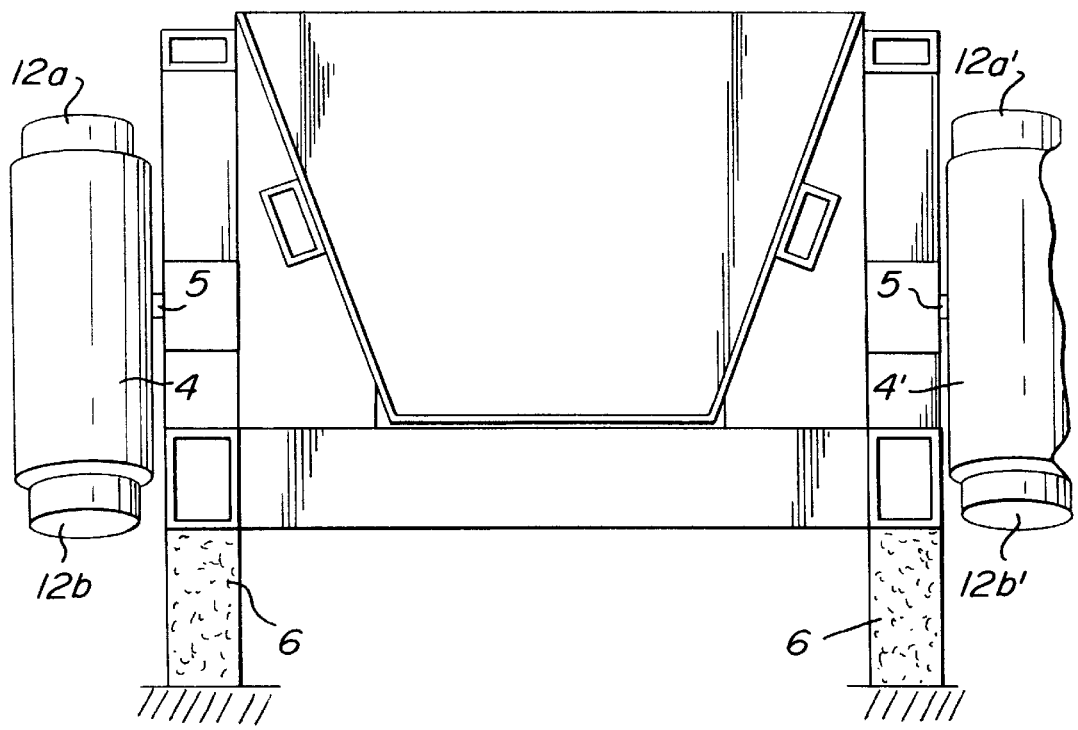
FIG. 2 is an end view of the conventional vibratory conveyor shown in FIG. 1.
Figure 3:
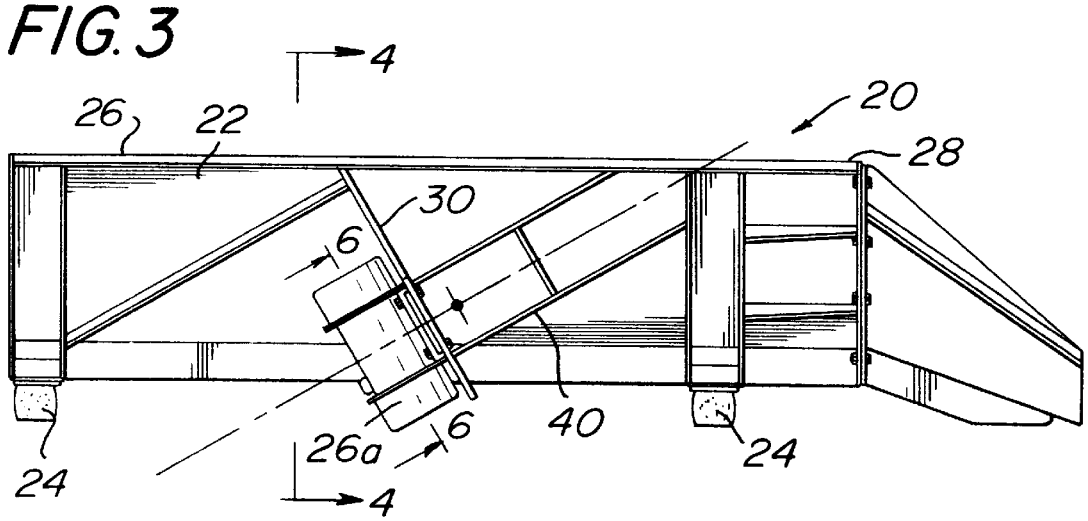
FIG. 3 is a side view illustrating one embodiment of a vibratory conveyor according to the invention.
Figure 4:
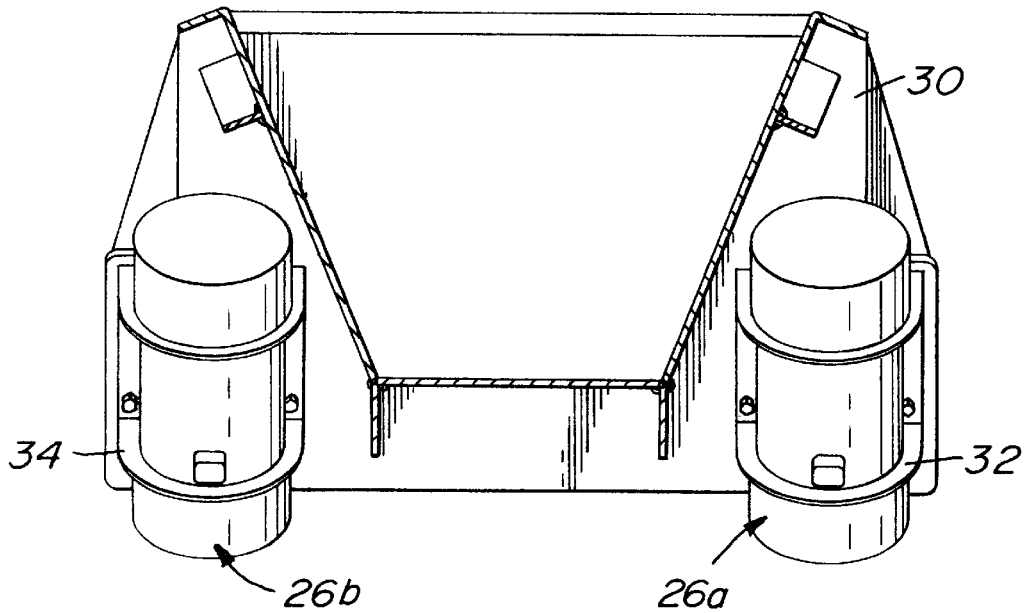
FIG. 4 is a sectional view taken along lines 4—4 of FIG. 3.

Referring now to the drawings, where like elements are identified by like numerals, there is shown in FIGS. 3 and 4 a preferred embodiment of a vibratory conveyor assembly designated by reference numeral 20.

The conveyor includes a trough or pan 22 and two actuators 26a and 26b, one mounted to each lateral side of the trough 22. The trough 22 may be supported by isolators (springs) that allow movement of the trough 22. The actuators 26a and 26b are mounted relative to the trough 22 at a selected angle (angle of attack). The resultant conveyor motion is at this angle and this causes the material to travel down the conveyor. The material is actually thrown a very short distance each time the conveyor moves back and forth. The total distance that the conveyor moves back and forth is known as the amplitude.

Each actuator 26a and 26b comprise a motor 27a and 27b, respectively. The motors 27a, 27b have output shafts extending from opposite ends. Attached to each output shaft is an offset weight. The motors 27a, 27b rotate in opposite directions and are 180 degrees out-of-phase relative to each other. As the motors 27a, 27b rotate, the resulting centrifugal force causes the conveyor 20 to move back and forth in an oscillating motion. When the motor rotates, a centrifugal force is generated due to the weight being located off center from the motor shaft. If only one motor were used, the conveyor would move in a circular motion. By using two motors, rotating in opposite directions and out-of-phase, the conveyor motion becomes linear. This occurs because the forces generated from the motors that would otherwise move the conveyor transversely, are always applied in equal and opposite directions. The transverse force from each motor is thereby canceled by the transverse force from the other motor. However, the forward and backward forces are always in phase and therefore cause the conveyor to move forward and backward. The motor-weight assembly is also known as a shaker or inertial weight motor.

The angle of attack of the conveyor affects the flow of material. At 45 degrees, the material speed and discharge rate (lb./hr.) will be the highest. Operating at angles less than 45 degrees causes the material to spread out more and a more uniform and steady flow rate results. When angles greater than 45 degrees are used, the material tends to move along in small piles. This causes the discharge rate to become less uniform. In addition, the greater the angle, the more noise is created.

The conveyor structure is designed to withstand the forces generated by the actuators. This includes the forward and backward forces as well as the transverse forces. The present invention uses a single saddle plate to which both shaker motors are mounted. With this design, the transverse forces from one motor are canceled by transverse forces from the other motor, through the saddle plate. Because of this, no transverse forces are transmitted through welds connecting the actuators to the trough. The forward and backward forces are transmitted from the saddle plate to the conveyor trough using large gussets. Although these gussets are welded to the saddle plate and trough, the system permits a large weld to be used.

The assembly 20 has a feed end 26 for receiving material and a discharge end 28 for delivering the material to a particular site. A pair of actuators 26a, 26b are coupled to a continuous saddle plate 30 by brackets 32 and 34, respectively. Actuators 26a, 26b each include motors 27a, 27b, respectively. Extending from each end of each motor 27a, 27b, is an output shaft 28a, 29a, 28b, 29b. Attached to each output shaft 28a, 29a, 28b, 29b, is an offset weight 30a, 31a, 30b, 31b, respectively. Weights 30a and 31a rotate at the same rotational speed ω as weights 30b and 31b but in an opposite direction and 180° out of phase. Due to this arrangement the transverse force created by actuator 26a are offset by the transverse force created by actuator 26b.

The actuators 26a, 26b are coupled to saddle plate 30 by brackets 32 and 34, respectively. The saddle plate 30 is couple to gussets 40 and 42. The gussets 40 and 42 are in turn welded to the trough 22. The orientation of the actuators 26a and 26b and the relationship of the respective weights is such that transverse forces of the individual motors cancel each other out.

The placement of the saddle plate 30 on the trough, and the corresponding placement of the actuators should be selected for optimum movement of material.

Figure 5:
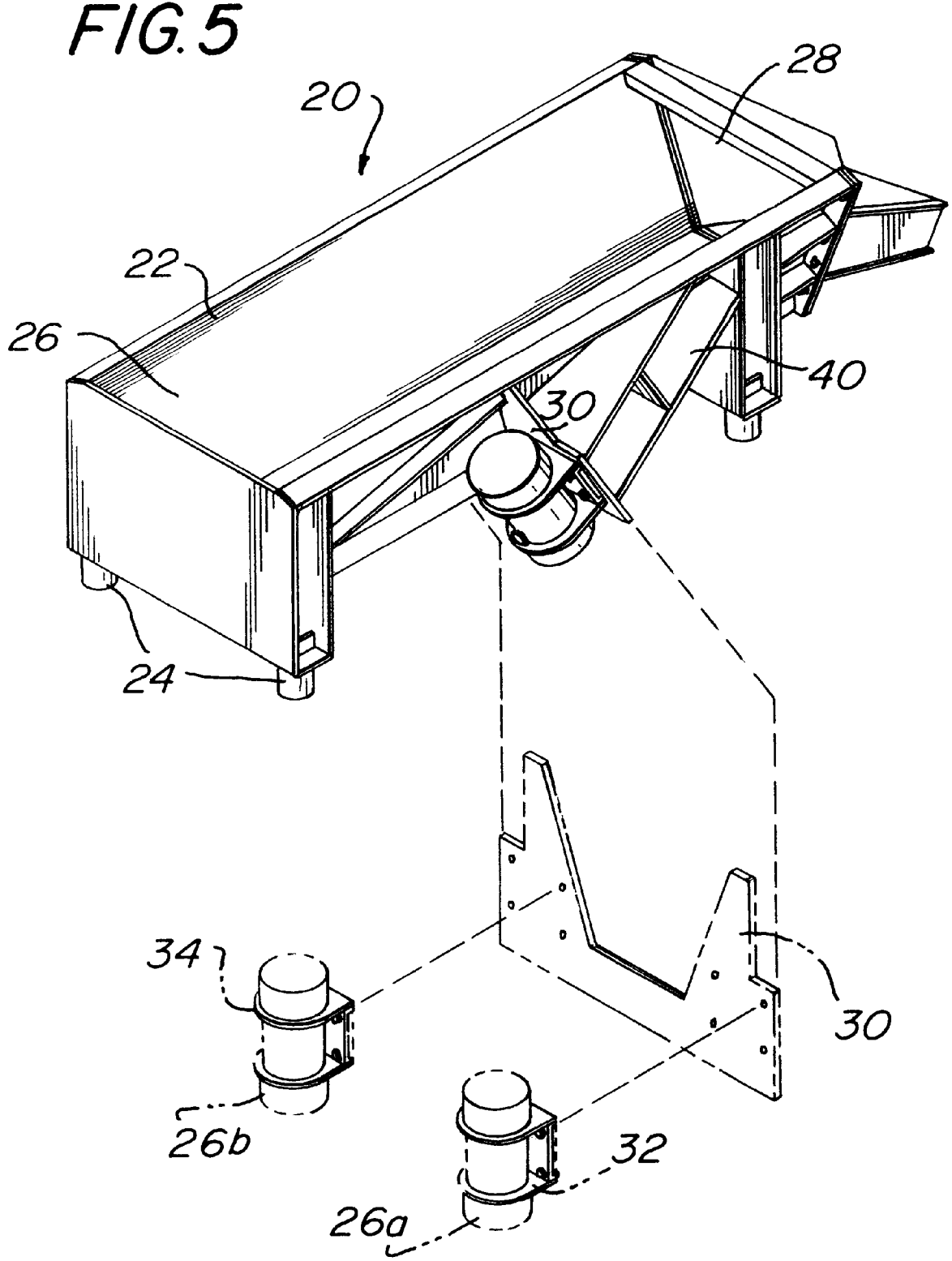
FIG. 5 is an isometric view illustrating the present invention as shown in FIG. 3 including a break out view of the actuators and saddle plate.
Figure 6:
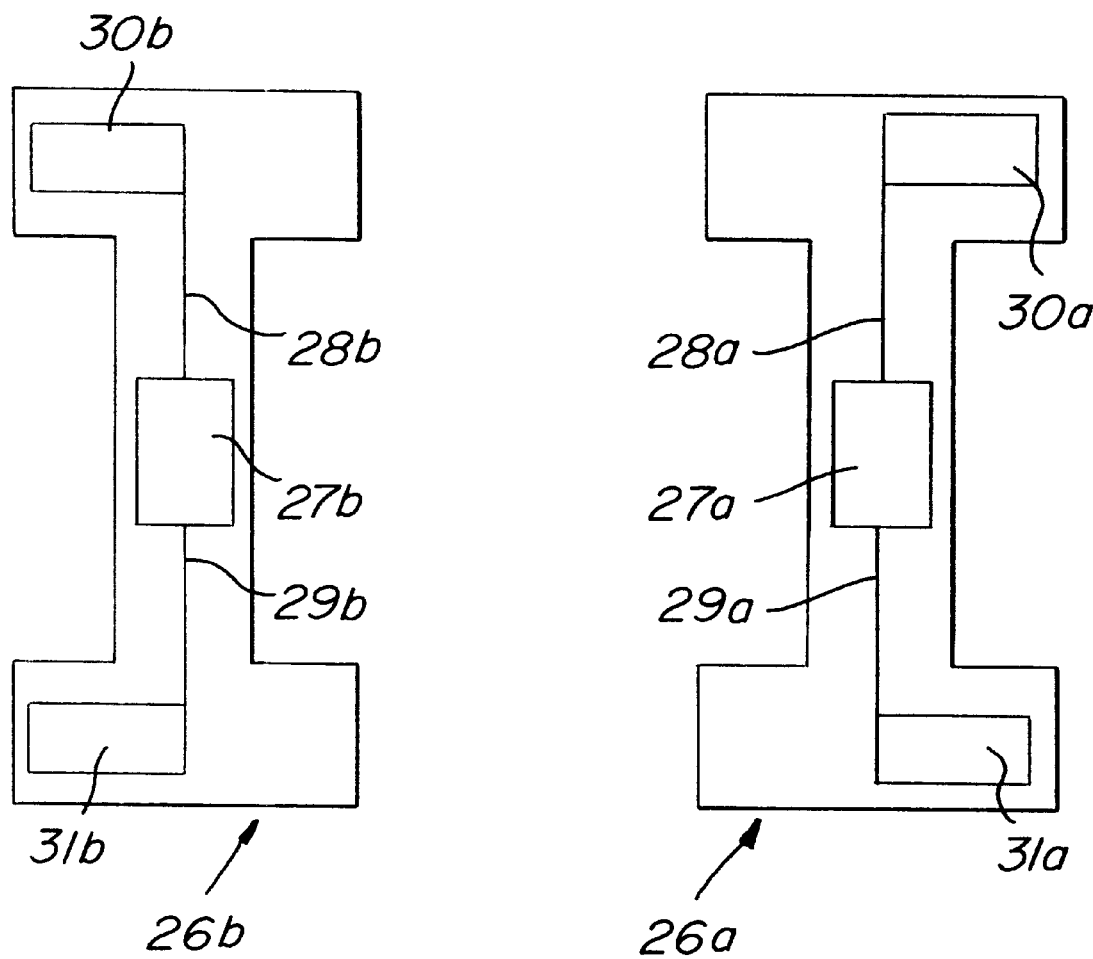
FIG. 6 is a sectional view along lines 6—6 in FIG. 3 of the actuators.

The preferred embodiment of FIGS. 3 and 5 provides a conveyor drive system which imparts a predominantly linear oscillating motion to the conveyor at a selected angle of attack (also known as stroke angle). In the preferred embodiment, the saddle plate 30 is coupled to the trough perpendicular to an axis of the trough, which is the longitudinal axis, as is evident from FIGS. 3 and 5. Linear motion will cause the conveyor material to be thrown for short distances and thereby travel down the conveyor. In order to provide the linear motion, the line of action (which passes through the saddle plate 30 perpendicular to the longitudinal axis of the trough) should pass through the center of gravity of the conveyor. Otherwise, the conveyor motion will be non-linear.

The parameters for the actuator should be determined based upon $$E \cdot R = \frac{X \cdot M}{2}$$

where E is the eccentric weight mass, R is the eccentric weight offset radius; X is the stroke (total peak-to-peak displacement occurring each operating cycle of the conveyor) and M is the mass of the conveyor trough 22. Typically a stroke of ¼" is desired.

The angle of attack or stroke angle also affects the flow of material down the conveyor. The angle at which the actuator motors are mounted relative to the horizontal plane is the stroke angle. The resultant conveyor motion will be at this angle. At 45° the highest material speed will be achieved.

Further, the use of the saddle plate 30 eliminates the need for mounting the actuators directly to the trough as, for example, through welding. Transverse forces created by the individual motor are dissipated through the saddle plate 30 instead of welds of prior art systems. Due to the orientation and unitary construction of the saddle plate 30, any transverse forces have less of an effect on the connection between the individual actuator 4 or 4' and the trough 22.

All forward and backward forces are transmitted from the actuator 26a and 26b through the saddle plate 30 to the conveyor trough 22 via the gussets 40 and 42. Although the gussets 40 and 42 are welded to the saddle plate 30 and the trough 4, this arrangement permits a large weld to be used.

Vibratory forces which occur between the saddle plate 30 and the gussets 40, 42 are relatively small because the trough 22 moves longitudinally and therefore will not cause damage to the system.

The present invention may be embodied in other variant forms where the variation does not substantially differentiate from the essential novelty and uniqueness revealed in the foregoing disclosure. Reference should therefore be made to the appended claims rather than the foregoing specification, as indicating the scope of the invention. It should be understood that many modifications, variations and changes may be made without departing from the spirit and scope of the invention as defined in the claims.

What is claimed is:

1. A vibratory conveyor assembly comprising:

a trough for containing articles to be advanced therein;

a frame supporting said trough;

at least one unitary one piece saddle plated extending along a first lateral side of said trough, underneath said trough, and along a second lateral side of said trough opposite said first lateral side;

a first gusset for each at least one saddle plate connected to the first lateral side and a second gusset for each at least one saddle plate connected to the second lateral side, the first and second gusset for each corresponding at least one saddle plate coupling the saddle plate to the trough;

a first actuator mounted exclusively on each one of the at least one saddle plate proximate to the corresponding first gusset; and a second actuator mounted exclusively on each one of the at least one saddle plate proximate to the corresponding second gusset, the first and second actuators being mounted on each at least one saddle plate to impart an oscillating motion to each at least one saddle plate which is transferred to the trough through the corresponding first and second gussets to cause the trough to move reciprocally.

2. A vibratory conveyor assembly as in claim 1, wherein each said first and second actuator comprises:

a motor having an output shaft extending axially at two opposite ends of said motor along a longitudinal axis thereof;

an eccentric weight coupled to each said output shaft wherein the first actuator motor and the second actuator motor rotate at the same rotational speed but in opposite directions and the weights coupled to the first actuator motor and the weights coupled to the second actuator motor are 180° out-of-phase relative to each other.

3. A vibratory conveyor assembly as in claim 1, wherein the actuators are connected to the saddle plate by brackets.

4. A vibratory conveyor system comprising:

a trough having a feed end and a discharge end;

at least one continuous saddle plate coupled to the trough perpendicularly to an axis of the trough said axis passing through the center of gravity of the trough; and first and second actuators mounted exclusively on each one of the at least one saddle plate on opposite sides of the trough wherein the actuators impart an oscillatory motion to each at least one saddle plate causing the trough to move reciprocally.

5. A vibratory conveyor assembly comprising:

trough for containing articles to be advanced therein;

frame supporting said trough;

at least one saddle plate extending from a first lateral side of said trough, about said trough, and to a second lateral side of said trough opposite said first lateral side;

a first gusset for each at least one saddle plate connected to the first lateral side and a second gusset for each at least one saddle plate connected to the second lateral side, the first and second gusset for each corresponding at least one saddle plate coupling the saddle plate to the trough;

a first actuator mounted exclusively on each one of the at least one saddle plate proximate to the corresponding first gusset; and a second actuator mounted exclusively on each one of the at least one saddle plate proximate to the corresponding second gusset, wherein the first and second actuators and the at least one saddle plate are connected to the gussets at a 45-degree angle to a vertical plane to transfer an oscillating motion to the trough through the corresponding first and second gussets to cause the trough to move reciprocally.

6. A vibratory conveyor assembly as in claim 5, wherein a force component generated by the actuators parallel to the longitudinal axis of the trough is directed along a plane intersecting a center of gravity of the conveyor assembly.

7. A vibrator conveyor assembly comprising:

a trough for containing articles to be advance therein;

a frame supporting said trough;

at least one saddle plate extending from a first lateral side of said trough, about said trough, and to a second lateral side of side trough opposite said first lateral side;

a first gusset for each at least one saddle plate welded to the lateral side and a second gusset for each at least one saddle plate welded to the second lateral side, the first and second gusset for each corresponding at least one saddle plate coupling the saddle plate to the trough;

a first actuator mounted exclusively on each one of the at least one saddle plate proximate to the corresponding first gusset; and a second actuator mounted exclusively on each one of the at least one saddle plate proximate to the corresponding second gusset, the first and second actuators being mounted on each at least one saddle plate to impart an oscillating motion to each at least one saddle plate which is transferred to the trough through the corresponding first and second gusset to cause the trough to move reciprocally.

* * * * *